(12) United States Patent
Jones et al.

(10) Patent No.: US 7,502,895 B2
(45) Date of Patent: Mar. 10, 2009

(54) TECHNIQUES FOR REDUCING CASTOUTS IN A SNOOP FILTER

(75) Inventors: Phillip Matthew Jones, Round Rock, TX (US); Kourosh Gharachorloo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 11/225,937

(22) Filed: Sep. 13, 2005

(65) Prior Publication Data

US 2007/0061520 A1   Mar. 15, 2007

(51) Int. Cl.
*G06F 12/08* (2006.01)
(52) U.S. Cl. .................. 711/146; 711/145; 711/148
(58) Field of Classification Search .......... 711/146, 711/133, 154, 156, 145, 148
See application file for complete search history.

(56) References Cited

U.S. PATENT DOCUMENTS

| | | | |
|---|---|---|---|
| 5,611,058 A | 3/1997 | Moore et al. | |
| 6,115,795 A | 9/2000 | Gilda et al. | |
| 6,678,798 B1 | 1/2004 | Kuskin et al. | |
| 6,829,683 B1 | 12/2004 | Kuskin | |
| 7,213,106 B1* | 5/2007 | Koster et al. | 711/119 |
| 7,305,524 B2* | 12/2007 | Hoover et al. | 711/146 |
| 7,404,046 B2* | 7/2008 | Goodman et al. | 711/146 |
| 2004/0117561 A1* | 6/2004 | Quach et al. | 711/146 |
| 2004/0255085 A1* | 12/2004 | Dieffenderfer et al. | 711/146 |
| 2006/0080508 A1* | 4/2006 | Hoover et al. | 711/133 |
| 2006/0224839 A1* | 10/2006 | Blumrich et al. | 711/146 |

FOREIGN PATENT DOCUMENTS

EP   661641 A2 *   7/1995

* cited by examiner

*Primary Examiner*—Pierre-Michel Bataille

(57) ABSTRACT

Method and apparatus for reducing castouts in a snoop filter. More specifically, there is provided a system comprising a plurality of buses, one or more processors coupled to each of the plurality of buses and a snoop filter. The snoop filter configured to eliminate unnecessary snoops of the plurality of buses, and further configured to track requests from the one or more processors only if tracking the request does not result in a castout penalty.

16 Claims, 7 Drawing Sheets

TECHNIQUES FOR REDUCING CASTOUTS IN A SNOOP FILTER

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

With the advent of standardized architectures and operating systems, computers have become virtually indispensable for a wide variety of uses from business applications to home computing. Whether a computer system is a personal computer or a network of computers connected via a server interface, computers today rely on processors, associated chip sets, and memory chips to perform most of the processing functions, including the processing of system requests. The more complex the system architecture, the more difficult it becomes to process requests in the system efficiently. Despite the increasing complexity of system architectures, demands for improved request processing speed continue to drive system design. Designers are often challenged with finding ways to reduce the cycle time for accessing data and processing requests.

Some systems include multiple processing units or microprocessors connected via a processor bus. By implementing multiple processors, system processing efficiency is improved by providing a system that is able to simultaneously process requests. To coordinate the exchange of information among the processors, a host/data controller is generally provided. The host/data controller is further tasked with coordinating the exchange of information between the plurality of processors and the system memory. The host/data controller may be responsible not only for the exchange of information in the typical Read-Only Memory (ROM) and the Random Access Memory (RAM), but also the cache memory in high speed systems. Cache memory is a special high speed storage mechanism which may be provided as a reserved section of the main memory or as an independent high-speed storage device. Essentially, the cache memory is a portion of the RAM which is typically made of high speed static RAM (SRAM) rather than the slower and cheaper dynamic RAM (DRAM) which may be used for the remainder of the main memory. Alternatively, each processor may have an associated cache memory. By storing frequently accessed data in the cache memory, the processor avoids having to re-access the shared memory each time the information is needed.

For multiprocessor and multibus shared memory systems, bus sniffing or bus snooping may be implemented to maintain system memory coherency. For bus sniffing/bus snooping techniques, an algorithm or apparatus should be designed to promote data changes by any agent to any other agent demand request. That is to say that in order to maintain coherency, each time a processor issues a request for memory data, the other processor caches may need to be searched for copies of that data, depending on the type of request, to insure that only the most up to date information is used. Some aspects of this apparatus is provided by the processor architecture. For example, X86 architecture maintains coherency across different levels of processor cache. The X86 architecture front side bus definition also deploys a self snooping protocol for agents that share the same bus. If more than one bus segment is supported in the system, a system level solution should be implemented to maintain coherency across a multitude of bus segments. Snoop filters or tag caches are a common solution for coordinating system level coherency across multiple bus segments. One of the primary goals of an efficient snoop filter design is to minimize the number of unnecessary snoops to preserve front side bus bandwidth for request and data traffic. This includes request snoops required to retrieve the most recent data or provide an agent exclusive access to data and to "castout" snoops required to make space in the tag cache for a forced inclusion snoop filter.

A typical snoop filter is implemented using a direct mapped policy where the tag cache can track only one tag at a given tag index. Each time a request accesses a particular tag index and the tag differs from the current tag at the index, the snoop filter runs a castout cycle using the current tag, to make room for the new tag. The castout cycle runs a back invalidation to the processor bus(es) being tracked by the snoop filter. If the processor needs the evicted cacheline again, it is forced to fetch the cache line from memory instead of its own cache. This results in a performance penalty, as the latency to an internal cache running at core clock speed compared to the latency to the main memory running at system bus clock speed can be an order of magnitude in difference.

The present invention may address one or more of the problems set forth above.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with embodiments of the present invention, a new approach to snoop filters is provided. In accordance with the present techniques, the basic operation of the filter described herein is to force inclusion on exclusive access only and not track shared accesses. As long as the cached data remains in the shared state, the data will not be evicted by the snoop filter algorithm. The penalty of this technique is that exclusive requests must invalidate all bus segments to insure shared data is removed from all processor caches except the request agent. To reduce the number of castouts with exclusive forced inclusion, a method is described that allows the snoop filter to track shared accesses until a penalty is encountered. As used herein, the "castout penalty" refers to the occurance of a castout snoop on a shared access with no net gain in precise snoop filter state information. In accordance with embodiments of the present invention, if a shared request causes a snoop filter castout that discards precise state information associated with the castout tag, the castout tag is retained, the castout snoop is canceled and the shared request is dropped from the snoop filter, as described further below.

Figure 1:
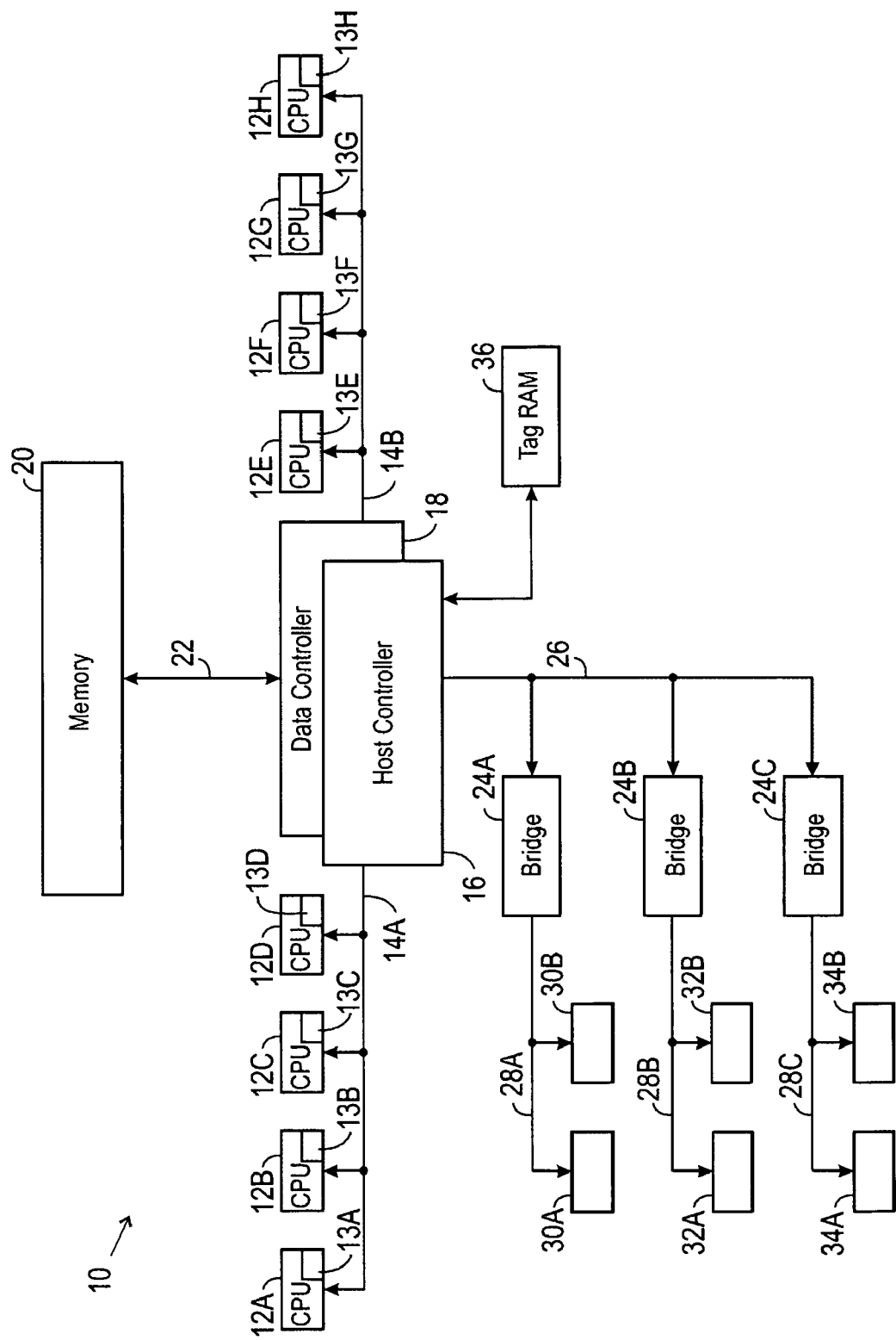
FIG. 1 is a block diagram illustrating an exemplary computer system having a multiple processor bus architecture according to the embodiments of the present invention.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 may utilize eight CPUs 12A-12H. Each CPU 12A-12H may include a respective cache memory 13A-13H for storing recently accessed information. The system 10 may utilize a split-bus configuration in which the CPUs 12A-12D are coupled to a first bus 14A and the CPUs 12E-12H are coupled to a second bus 14B. It should be understood that the processors or CPUs 12A-12H may be of any suitable type, such as a microprocessor available from Intel, AMD, or Motorola, for example. Each CPU 12A-12H may include a segment of cache memory for storage of frequently accessed data and programs. Furthermore, any suitable bus configuration may be coupled to the CPUs 12A-12H, such as a single bus, a split-bus (as illustrated), or individual buses. By way of example, the exemplary system 10 may utilize Intel Pentium IV processors and the buses 14A and 14B may operate at 100/133 MHz.

Each of the buses 14A and 14B may be coupled to a chip set which includes a host controller 16 and a data controller 18. In this embodiment, the data controller 18 may be effectively a data cross-bar slave device controlled by the host controller 16. The data controller 18 may be used to store data awaiting transfer from one area of the system 10 to a requesting area of the system 10. Because of the master/slave relationship between the host controller 16 and the data controller 18, the chips may be referred to together as the host/data controller 16, 18.

The host/data controller 16, 18 is coupled to main memory 20 via a memory bus 22. The memory 20 may include one or more memory devices, such as dynamic random access memory (DRAM) devices, configured to store data. The memory devices may be configured on one or more memory modules, such as dual inline memory modules (DIMMs). Further, the memory modules may be configured to form a memory array including redundant and/or hot pluggable memory segments. The memory 20 may also include one or more memory controllers (not shown) to coordinate the exchange of requests and data between the memory 20 and a requesting device such as a CPU 12A-12H or I/O device.

The host/data controller 16, 18 is typically coupled to one or more bridges 24A-24C via an Input/Output (I/O) bus 26. The opposite side of each bridge 24A-24C may be coupled to a respective bus 28A-28C, and a plurality of peripheral devices 30A and 30B, 32A and 32B, and 34A and 34B may be coupled to the respective buses 28A, 28B, and 28C. The bridges 24A-24C may be any of a variety of suitable types, such as PCI, PCI-X, EISA, AGP, etc. Finally, as described further below with reference to FIG. 2, the system 10 includes a tag RAM 36 that is configured to store state information corresponding to the state of each system bus, such as the buses 14A and 14B.

Figure 2:
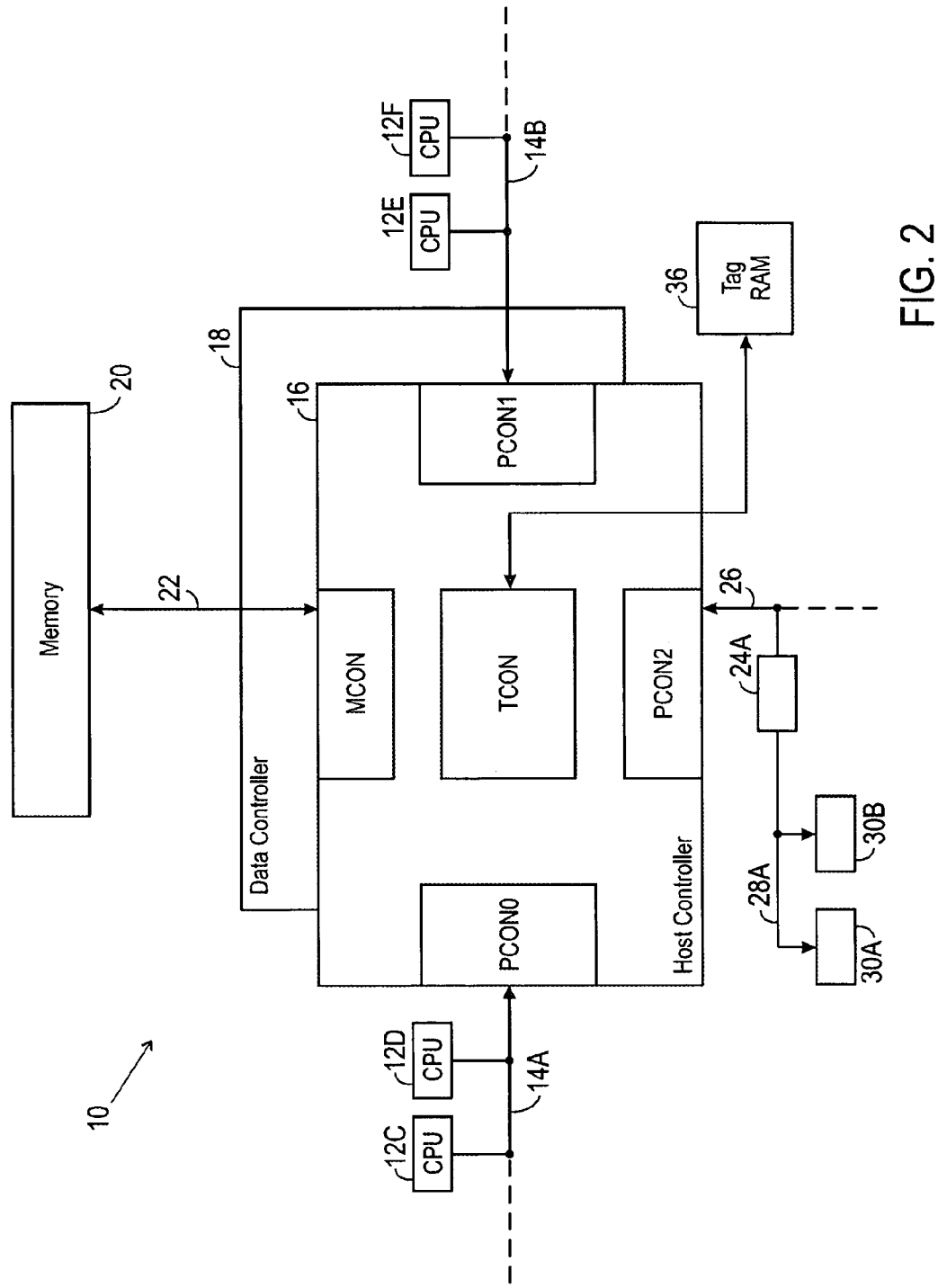
FIG. 2 is a block diagram illustrating an exemplary host controller in accordance with embodiments of the present invention.

FIG. 2 illustrates a block diagram of the host/data controller 16, 18. As can be appreciated, each of the components illustrated and described with reference to the host controller 16 may have a corresponding companion component in the data controller 18. The functionality of each component may be described generally with respect to the host controller 16, which may be configured to receive requests and to coordinate the exchange of requested data through the data controller 18. The host controller 16 generally coordinates the exchange of requests and data from the processor buses 14A and 14B, the I/O bus 26, and the memory bus 22.

The host controller 16 may include a memory controller MCON that facilitates communication with the memory 20. The host controller 16 may also include a processor controller PCON for each of the processor and I/O buses 14A, 14B, and 26. For simplicity, the processor controller corresponding to the processor bus 14A is designated as "PCON0." The processor controller corresponding to the processor bus 14B is designated as "PCON1." The processor controller corresponding to the I/O bus 26 is designated as "PCON2." Essentially, each processor controller PCON0-PCON2 serves to connect a respective bus external to the host controller 16 (i.e., processor bus 14A and 14B and I/O bus 26) to the internal blocks of the host controller 16. Thus, the processor controllers PCON0-PCON2 facilitate the interface from the host controller 16 to each of the buses 14A, 14B, and 26. Further, in an alternate embodiment, a single processor controller PCON may serve as the interface for all of the system buses 14A, 14B, and 26. The processor controllers PCON0-PCON2 may be referred to collectively as "PCON." Any number of specific designs for the processor controller PCON and the memory controller MCON may be implemented in conjunction with the techniques described herein, as can be appreciated by those skilled in the art.

The host controller 16 may also include a tag controller TCON or snoop filter. As used herein, the terms "tag controller TCON" and "snoop filter" will be used interchangeably. Generally, the tag controller TCON maintains coherency and request cycle ordering in the system 10. "Cache coherence" refers to a protocol for managing the caches (e.g., caches 13A-13H) and shared system memory 20 to insure that demand or request accesses to system memory 20 receive data that includes the latest updates. Once the data is received by the requesting agent, it may be stored in a local cache for future accesses (reads and writes). When a subsequent request is made to data previously requested, it may be found in the processors local cache. The processor will check for a local copy of the data before forwarding the request to the front side bus where it is processed by the host controller (e.g., system 10) Generally, the tag controller TCON (or snoop filter) is the mechanism that tracks tag and state information, filters snoops and issues castout snoops based on the current request and state information stored in the tag RAM 36. The tag controller TCON maintains coherency by ordering access to the tag RAM 36. The tag controller TCON is also tasked with snooping each of the buses 14A and 14B and the caches 13A-13H associated with the corresponding buses to retrieve modified data or transfer cacheline ownership between buses 14A and 14B.

As previously described, a tag RAM 36 may be provided to identify which data from the main memory is currently stored in each processor cache associated with each memory segment. The tag controller TCON or snoop filter is a mechanism used to reduce bus traffic in certain computer systems, particularly multiple-processor systems. The tag RAM 36 is essentially a specialized cache for storing cache tag and state information of memory cachelines stored in local processor caches 13A-13H of the processors 12A-12H. The snoop filter keeps track of the coherency state of each cache line of each of the processors 12A-12H. The state information in the tag RAM 36 is used by the snoop filter to decide which bus transactions received from the various processors 12A-12H should be passed on to other processors 12A-12H in the system 10 to maintain coherent memory. The snoop filter filters unnecessary bus transactions by preventing them from reaching those processors 12A-12H on adjacent bus segments if coherency can be resolved without accessing those segments. Hence, the snoop filter can have a dramatic positive impact on the overall system performance by reducing snoop traffic on the front side bus.

As previously described, the snoop filter essentially provides a directory to the data stored in the processor caches. For each request, received at the host controller 16, the address is decomposed into a tag and a direct mapped index. The tag is stored in the tag RAM 36, along with bus and state identification information. As previously discussed, the tag RAM 36 generally comprises a buffer having a number of indices, wherein each index is configured to store a single tag. Alternatively, each tag index may be configured to store multiple tags. Each time a request accesses a particular tag index and the tag differs from the current tag at that index, the snoop filter runs a castout cycle using the current tag to make room for the new tag. Whenever the snoop filter evicts a cacheline, an invalidate cycle is issued to invalidate the processor caches, forcing subsequent cycles to retrieve data from system memory 20, rather than the internal cache 13A-13H. This results in performance penalty as the latency to an internal cache 13A-13H running at core clock speed is much smaller than the latency to system memory 20 running at system bus clock speeds.

One commonly used standard for maintaining cache coherence is known as the "MESI protocol." In accordance with the MESI protocol, each cache line is marked with one of the four MESI states: Modified, Exclusive, Shared or Invalid. The cache lines are marked by encoding two additional bits added to the cache line. As will be appreciated, the Modified state indicates that a cache line was modified and therefore the underlying data (i.e., the associated data in main memory) is no longer valid. In other words, the data in one of the caches is more recent that the data stored in memory. The Exclusive state indicates that a cache line is only stored in this cache and has not been changed by a write access yet. A copy of data stored in a cache which is in an Exclusive state is writable. The Shared state indicates that a cache line may be stored in other processor caches. Shared state cachelines are generally read-only copies of the data stored in memory. The Invalid state indicates that the data is no longer valid and is no longer present in the cache.

Typical snoop filters for x86 applications track all request allocations, based on MESI protocol. This results in a high number of castouts with a high number of castouts penalizing the processor as it continues to access the evicted cacheline. In order to reduce the number of castouts (or "evictions"), the presently disclosed snoop filter is configured to track only requests allocated to certain states, as previously described (exclusive forced inclusion). In accordance with embodiments of the present invention, a modified MESI protocol is implemented to selectively track Shared state information in an exclusive forced inclusion snoop filter. The criteria for tracking a request agent's Shared state is that the request does not have an associated castout penalty when tracked. If a request allocates to Shared (BRLC or BRLD) and the snoop filter determines the request tag is a tagmiss, the snoop filter will retain the current tag and state as will be described further below with reference to FIG. 3 and FIG. 4. This preserves the state history of the current tag and avoids unnecessary castout snoop cycles (castout penalty). Additionally, retaining the current tag and state will preserve any precise state information that has accumulated to the existing tag. If a request allocates to Invalid (BWIL) and the snoop filter determines the request is a tagmiss, the snoop filter will retain the existing tag and state history if the castout state is in any state other than Unknown, as described in more detail below with reference to FIG. 6 below. If the castout state is unknown, the snoop filter will update the tag and set the state to Invalid. This sets the stage to track a subsequent Shared request should it be a taghit. The following information relevant to the modified protocol states described herein may be helpful.

EXCLUSIVE STATE: The present snoop filter will track those requests that are allocated to the Exclusive state or the Modified state. In accordance with one exemplary embodiment, the front side bus may not be configured to distinguish between requests that allocate to the Exclusive state or the Modified state and will appear identical to the snoop filter. Advantageously, this embodiment may be implemented by tracking fewer front side bus attributes. This exemplary embodiment is described herein. Accordingly, further references to the "Exclusive state" refer to either an Exclusive or Modified state. Alternatively, the system may be designed such that processor allocation to the Exclusive or Modified state can be tracked independently.

SHARED STATE: Further, unlike prior snoop filters, the present exemplary snoop filter does not track all requests allocated to the Shared state. Rather, the snoop filter only tracks those requests allocated to the Shared state if the request does not have a castout penalty associated with it. By identifying tags that are Invalid or Exclusive before a request to shared is issued by a processor agent, Shared states can be tracked without causing castout cycles.

UNKNOWN STATE: Those requests that allocate to Shared state but have a castout penalty associated with them, will not be tracked in the snoop filter and will inherit the default "Unknown state." This technique results in one or more busses having shared data that is not tracked in the snoop filter. The processor and IO busses are allowed to share the address as long one of the bus agents does not execute a request for exclusive access (BRIL or BWIL). As used herein, anytime a tag is referred to as being "dropped" from the snoop filter, it is said to be in the Unknown state.

INVALID STATE: Further, in accordance with the present techniques, the Invalid state tracks tags taken to the Invalid state by normal program flow, as will be appreciated by those skilled in the art. This includes BWILs that hit an existing tag in the snoop filter or BWLs that take the processor cache to the Invalid state.

By tracking shared states under the rules defined in the flow charts illustrated in FIGS. 3-7, the number of castouts is reduced, allowing the processor to continue accessing the cacheline from its internal cache. Furthermore, since the majority of requests allocate to the Shared state without associated penalty, the snoop filter is available to track exclusive states or modified states ("Exclusive state") and limited shared allocations ("Shared state"), thereby increasing the apparent size and efficiency of the snoop filter. As discussed above, if shared states are to be tracked, the snoop filter must guarantee that the bus state information is accurate. In other words, if the snoop filter tracks a Shared state on one or more buses (e.g., 14A and 14B) for a single address, the remaining buses must be invalid. To insure the accuracy of the bus state tracker when tracking the Shared states, the snoop filter identifies when an address is known to be invalid or exclusive (i.e., modified/exclusive). From this point, the state tracker can accurately track (under the modified state definitions), the Shared state.

During a typical read operation, a requesting device such as the CPU 12D or the peripheral device 30A, for example, may initiate read requests to the host controller 16. The respective processor controller PCON sends the request to the memory controller MCON and the tag controller TCON. The memory controller MCON passes the request to the memory 20 to obtain the requested data. Concurrently, the tag controller TCON may send a tag lookup request to the tag RAM 36 to determine whether the requested data is currently stored in one of the processor caches 13A-13H. Generally if the tag state information indicates and exclusive or modified state (Owned State) on a remote bus, the tag controller TCON will issue a snoop cycle. If a tag match is found (HIT#), the remote bus will return modified data which will be reconciled with the original request to memory before the data is returned to the requester.

Generally, depending on the type of request, certain steps are taken to advantageously implement the embodiments of the present invention, as described further below with respect of FIGS. 3-7. In summary, in order to reduce castouts or evictions, the snoop filter applies forced inclusion to exclusive/modified (owned) cycles. As long as requests are allocating to the shared state, they will not be tracked in the snoop filter unless there is no penalty associated with tracking the request. To maximize the benefit of owned forced inclusion, the tag controller TCON will force requests to the shared state whenever possible. This is accomplished on the processor bus by asserting HIT# in the snoop phase on all read commands (e.g., Bus Read Line Code and Bus Read Line Data) that support the HIT# snoop response. For these cases, if a remote bus is in the exclusive state, a snoop will be issued to demote the remote bus to the shared state. If a read command does not support the HIT# snoop response, the processors 12A-12H are configured to take the cache line owned (exclusive/modified). For these cases, the snoop filter 36 will always issue an invalidate snoop to the adjacent processor bus 14A or 14B to invalidate a shared copy of the cache line that is potentially cached by one of the processors 12A-12H on that bus.

One exception to the general rule is if the read request hits an exclusive state on the request bus. In this case, the host controller cannot assert HIT# or an infinite snoop stall may occur. The final state is determined by the read request type and whether or not another agent on the request bus asserts HIT. The I/O bus 26 is handled like the processor bus 14A or 14B except it cannot go exclusive. The snoop filter 36 will either (1) issue a snoop to the I/O bus 26 to invalidate a potentially shared copy or (2) actually track I/O reads in the snoop filter and only issue downstream snoops if the address associated with the processor read request matches the I/O address in the snoop filter. If the read request originates on the I/O bus 26, snoops are only required if the read address hits an exclusive address in the snoop filter 36. In this case a snoop will be issued to the bus specified in the tag cache to invalidate the processor cache 13A-13H and retrieve modified data if necessary. In general, I/O cycles allocate to the shared state so they do not need to snoop the processor buses 14A and 14B as long as the processor buses are invalid or shared and have no associated penalty.

Figure 3:
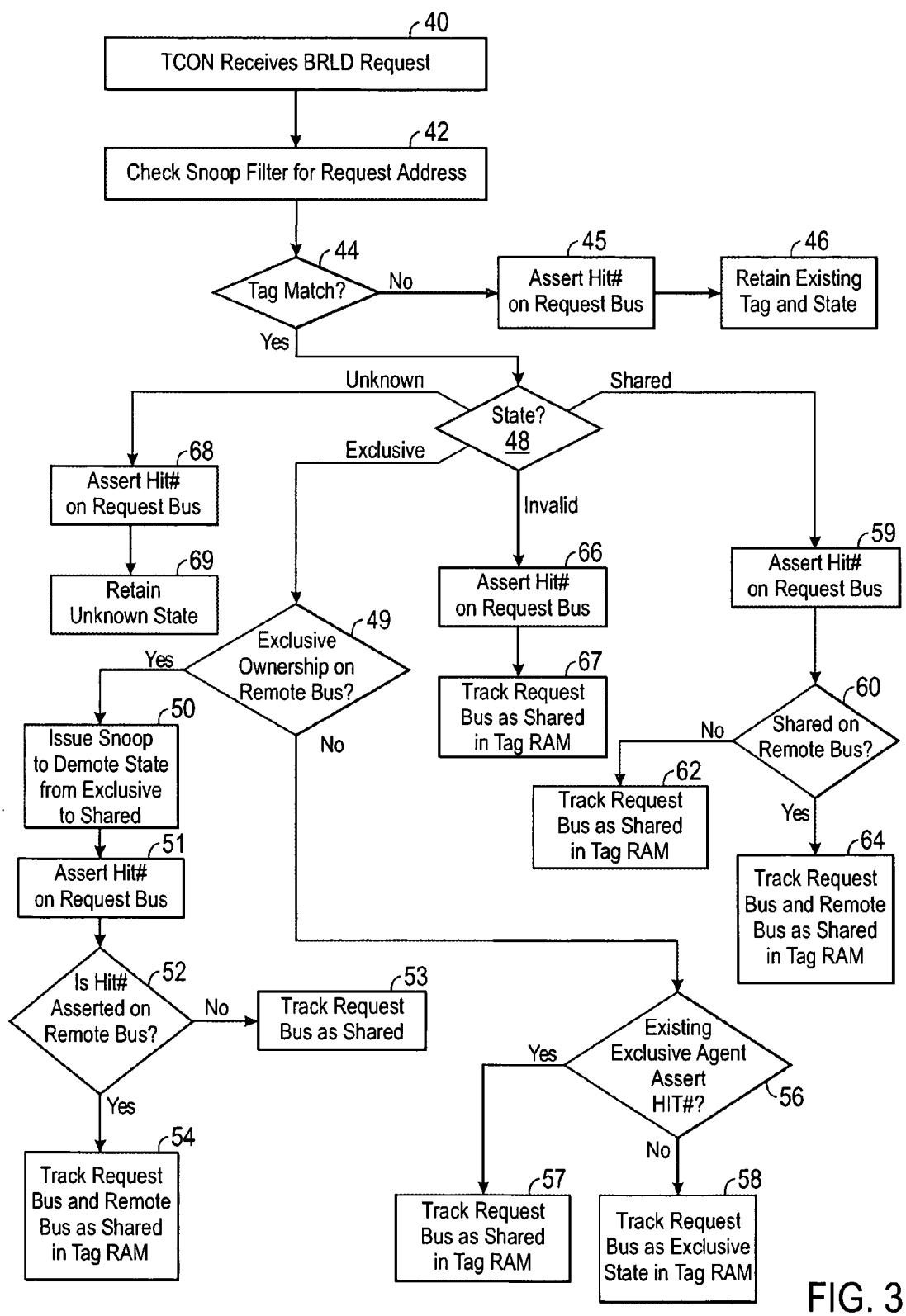
FIGS. 3-7 are respective flow charts illustrating an improved method of processing various request types in a computer system in accordance with embodiments of the present invention.

FIG. 3 is a flow chart illustrating the handling of a Bus Read Line Data (BRLD) request. When a BRLD request is executed by a CPU 12A-12H, it is received at the tag controller TCON, as indicated in block 40. The tag controller TCON will search the tag RAM for the request address, as indicated in block 42. First, the tag controller TCON will determine whether there is a tag match (i.e., whether the request address is currently being tracked in the snoop filter 36), as indicated in block 44. If there is no tag match, then the tag controller TCON asserts the HIT# on the request bus, as indicated in block 45. Since the tag cache does not have any history on the new tag, system agents may already have the address cached in the Shared state and the new tag must remain in the Unknown state. No additional information is gained by the snoop filter by tracking the new tag in the Unknown state. Therefore, the current tag is not castout but is retained instead along with any state information that exists, and the request address will not be tracked by the snoop filter 36, as indicated in block 46.

If the tag controller TCON determines that there is a tag match (block 44), the tag controller will determine whether the request is in an exclusive state, an invalid state, a shared state or an unknown state, as indicated in block 48. If the request is in the exclusive state, the tag controller TCON checks the bus-state information stored in the tag RAM 36 to determine whether the cache line indicates exclusive ownership on a remote bus (a bus other than the bus initiating the request) or indicates exclusive ownership on the same bus as the request, as indicated in block 49. If the snoop filter bus-state information indicates exclusive ownership on a remote bus, a snoop is issued to demote the exclusive state to shared in the remote-bus CPU cache, as indicated in block 50. The snoop filter will monitor the snoop phase of the snooped bus to see if a processor agent asserts HIT, indicating its intention of keeping a shared copy of the data cached. Following this snoop cycle, the tag controller TCON asserts HIT# on the request bus, as indicated in block 51. Next, the snoop filter will determine whether HIT# is asserted on the remote bus, as indicated in block 52. If not, the snoop filter tracks the request bus as shared, as indicated in block 53. If HIT# is asserted on the remote bus, all bus states are known to be shared and both buses (remote and request) are tracked as shared in the snoop filter, as indicated in block 54.

Returning to block 50, if a tag match occurs with an exclusive state and the snoop filter bus-state information indicates exclusive ownership on the same bus as the request (requesting bus), no snoops are issued, because the bus is a self-snooping bus. In this situation (i.e., snoop filter indicates exclusive state on the request bus), the tag controller TCON cannot assert HIT# during the snoop phase as it will lead to an infinite snoop stall if the exclusive CPU asserts HITM#. The next step depends on whether the existing exclusive agent (as opposed to the tag controller TCON) asserts HIT#, as indicated in block 56. If the existing exclusive agent asserts HIT#, then the shared state on the requesting bus is tracked in the snoop filter, as indicated in block 57. If the existing exclusive agent does not assert HIT#, then the requesting agent is allowed to allocate to the exclusive state and is tracked as such in the snoop filter, as indicated in block 58.

Returning to block 48, if there is a tag match, and the request is in the shared state, the tag controller TCON asserts the HIT# on the request bus, as indicated in block 59. Next, the tag controller TCON determines whether the cache line is shared on the remote bus or shared on the request bus, as indicated in block 60. If the cacheline corresponding to the request is not shared on the remote bus (and thus is shared on the request bus), the shared state is tracked in the snoop filter on the request bus, as indicated in block 62. If the cache line is in the shared state on the remote bus, the snoop filter may issue a snoop to the remote bus and monitor the snoop response to determine the next state. The algorithm illustrated in FIG. 3 does not issue a snoop to the remote Shared bus.

Consequently, the remote Shared bus must retain the Shared state to remain coherent, as indicated in block 64.

Returning again to block 48, if the request is in the invalid state, the tag controller TCON asserts the HIT# on the request bus, as indicated in block 66. The shared state is tracked in the snoop filter on the request bus, as indicated by block 67. Finally, if the request is in the unknown state, the tag controller TCON asserts HIT#, as indicated in block 68 and the tag state is retained as unknown, as indicated in block 69.

Figure 4:
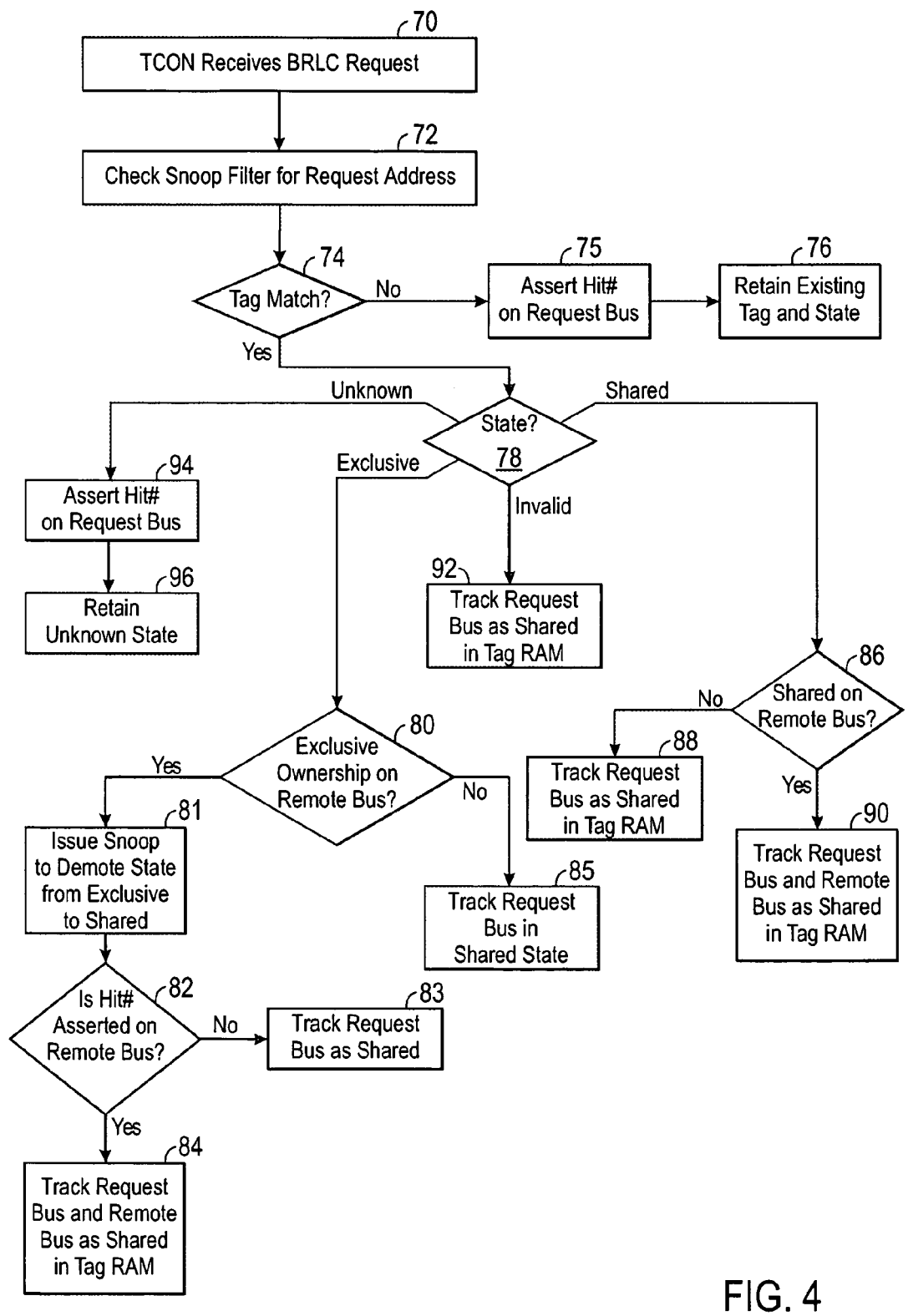

FIG. 4 is a flow chart illustrating the processing of a Bus Read Line Code (BRLC) request. When a BRLC request is executed by a CPU 12A-12H, it is received at the tag controller TCON, as indicated in block 70. The tag controller TCON will search the snoop filter for the request address, as indicated in block 72. First, the tag controller TCON will determine whether there is a tag match (i.e., whether the request address is currently being tracked in the snoop filter), as indicated in block 74. If there is no tag match, then the tag controller TCON asserts the HIT# on the request bus, as indicated in block 75. Since the tag cache does not have any history on the new tag, system agents may already have the address cached in the Shared state and the new tag must remain in the Unknown state. No additional information is gained by the snoop filter by tracking the new tag in the Unknown state. Therefore, the current tag is not castout but is retained instead along with any state information that exists and the request address will not be tracked by the snoop filter 36, as indicated in block 76.

If the tag controller TCON determines that there is a tag match (block 74), the tag controller will determine whether the request is in an exclusive state, an invalid state, a shared state or an unknown state, as indicated in block 78. If the request is in the exclusive state, the tag controller TCON checks the bus-state information stored in the tag RAM 36 to determine whether the cache line indicates exclusive ownership on a remote bus (a bus other than the bus initiating the request) or indicates exclusive ownership on the same bus as the request, as indicated in block 80. If the snoop filter bus-state information indicates exclusive ownership on a remote bus, a snoop is issued to demote the exclusive state to shared in the remote-bus CPU cache, as indicated in block 81 Next, the snoop filter will determine whether HIT# is asserted on the remote bus, as indicated in block 82. If not, the snoop filter tracks the request bus as shared, as indicated in block 83. If HIT# is asserted on the remote bus, all bus states are known to be shared and both buses (remote and request) are tracked as shared in the snoop filter, as indicated in block 84. If a tag match occurs with an exclusive state and the snoop filter bus-state information indicates exclusive ownership on the same bus as the request (requesting bus), no snoops are issued, because the bus is a self-snooping bus. Thus, the request bus is tracked as shared in the snoop filter, as indicated in block 85.

Returning to block 78, if there is a tag match, and the request is in the shared state, the tag controller TCON determines whether the cache line is shared on the remote bus or shared on the request bus, as indicated in block 86. If the cache line corresponding to the request is not shared on the remote bus (and thus is shared on the request bus), the shared state is tracked in the snoop filter on the request bus, as indicated in block 88. If the cache line is in the shared state on the remote bus, the shared state is tracked in the snoop filter on both the remote bus and the request bus, as indicated in block 90.

Returning to block 78, if the request is in the invalid state, the shared state is tracked in the snoop filter on the request bus, as indicated by block 92. Finally, if the request is in the unknown state, the tag controller TCON asserts HIT#, as indicated in block 94 and the tag is retained in the unknown state, as indicated in block 96.

Figure 5:
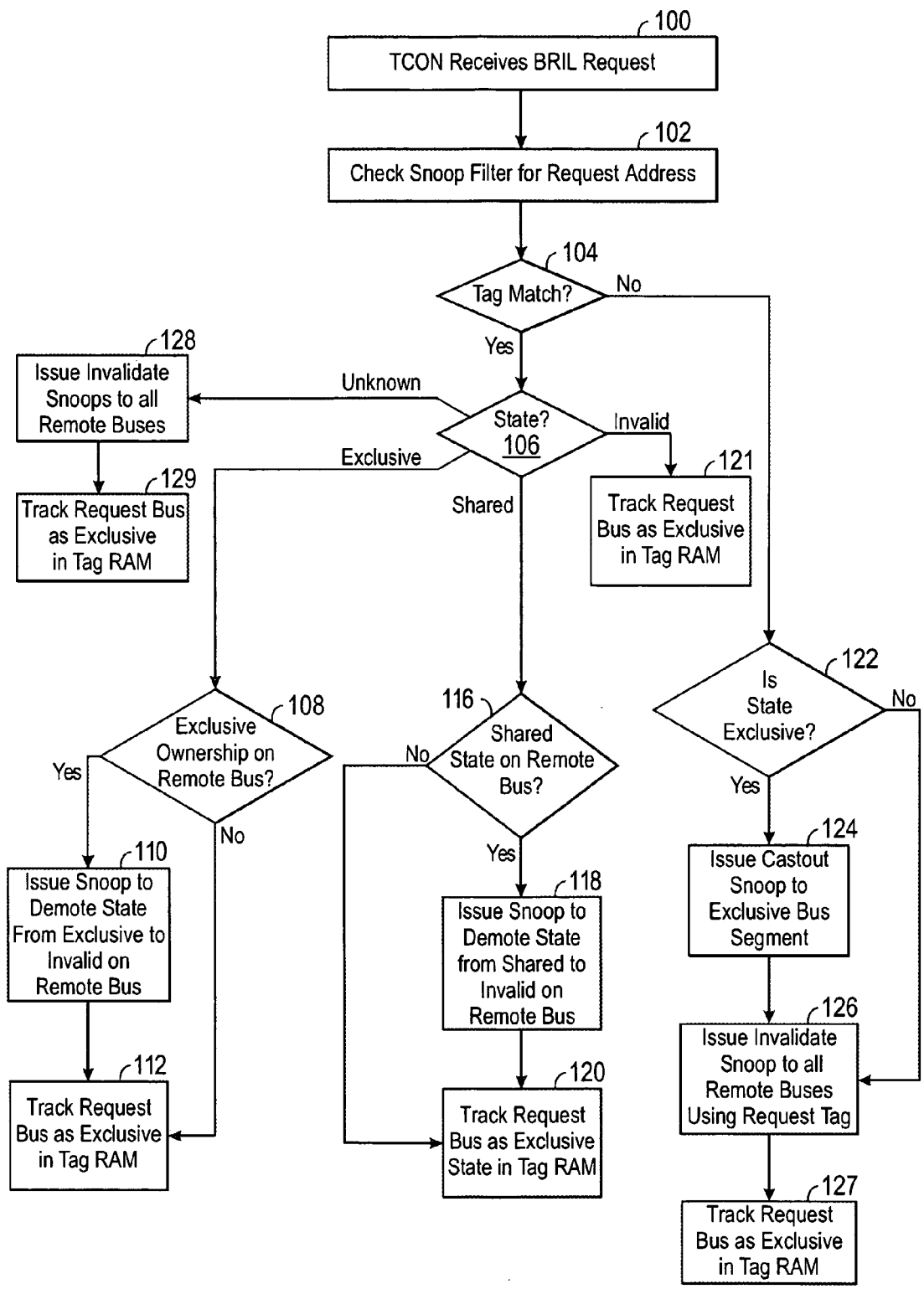

FIG. 5 is a flow chart illustrating the handling of a Bus Read and Invalidate Line (BRIL) request. Generally, in accordance with embodiments of the present invention, the snoop filter 36 tracks BRIL requests as exclusive in the tag RAM 36 since the requesting CPU 12A-12H will allocate the request address as either exclusive or modified. When a BRIL request is executed by a CPU 12A-12H, it is received at the tag controller TCON, as indicated in block 100. The tag controller TCON will search the snoop filter for the request address, as indicated in block 102. First, the tag controller TCON will determine whether there is a tag match (i.e., whether the request address is currently being tracked in the tag RAM 36), as indicated in block 104.

If a tag match occurs, the tag controller TCON will determine whether the request is in an exclusive state, an invalid state, a shared state or an unknown state, as indicated in block 106. If the request is in the exclusive state, the tag controller TCON checks the bus-state information stored in the tag RAM 36 to determine whether the cache line indicates exclusive ownership on a remote bus (a bus other than the bus initiating the request) or indicates exclusive ownership on the same bus as the request, as indicated in block 108. If the snoop filter bus-state information indicates exclusive ownership on a remote bus, a snoop is issued to demote the state from exclusive to invalid on the remote-bus CPU cache, as indicated in block 110. Following this snoop cycle, the snoop filter tracks the request bus as exclusive in the tag RAM 36, as indicated in block 112. If a tag match occurs with an exclusive state and the snoop filter bus-state information indicates exclusive ownership on the same bus as the request (requesting bus), no snoops are issued, because the bus is a self-snooping bus. The snoop filter tracks the request bus as exclusive in the tag RAM 36, as indicated in block 112.

Returning to block 106, if there is a tag match, and the request is in the shared state, the tag controller TCON determines whether the cache line is shared on the remote bus or shared on the request bus, as indicated in block 116. If the cache line corresponding to the request is not shared on the remote bus (and thus is shared on the request bus), the request bus is tracked as exclusive in the tag RAM 36, as indicated in block 120. If the cache line is in the shared state on the remote bus, a snoop is issued to demote the state from shared to invalid on the remote-bus CPU cache, as indicated in block 118. Following this snoop cycle, the snoop filter tracks the request bus as exclusive in the tag RAM 36, as indicated in block 120. Finally, if the request is in the invalid state, the request bus is tracked as exclusive in the tag RAM 36, as indicated by block 121.

Returning to block 106, if there is a tag match and the request is in the unknown state, invalidate-snoops are issued to any bus that is remote to the request bus using the request tag address, as indicated in block 128. The purpose for the snoops is to invalidate potential shared states on these remote buses. As will be appreciated, the request bus is self-snooping and therefore does not receive a specific snoop. Finally, the snoop filter tracks the request bus as exclusive in the tag RAM 36, as indicated in block 129.

Returning to block 104, the tag controller (TCON) may determine that there is no tag match. If a tag match does not occur, the tag controller (TCON) will determine whether the tag state is Exclusive, as indicated in block 122. If the castout state is Exclusive, the bus segment specified by the Exclusive state bits (may be the request bus) is snoop invalidated with the castout tag, as indicated in block 124. Next, invalidate-snoops are issued to any bus that is remote to the request bus using the request tag address, as indicated in block 126. The purpose for the snoops is to invalidate potential shared states on these remote buses. As will be appreciated, the request bus is self-snooping and therefore does not receive a specific snoop. Finally, the snoop filter tracks the request bus as exclusive in the tag RAM 36, as indicated in block 127. If the state associated with the castout tag is any state other than Exclusive, no castout snoops are issued. In either case, all remote busses are snoop invalidated using the request address to invalidate potentially shared data in agent caches.

Returning to block 122, if no tag is present at the tag index, then all previous requests to the current request address are assumed to be in the shared state. In this case, the tag controller TCON assumes that one or more of the remote buses has the same address as the request cached in the shared state. Since BRILs always allocate to exclusive or modified, snoops are issued to all remote buses using the request tag to invalidate their caches, as indicated in block 126. Finally, the snoop filter tracks the request bus as exclusive in the tag RAM 36, as indicated in block 127.

Figure 6:
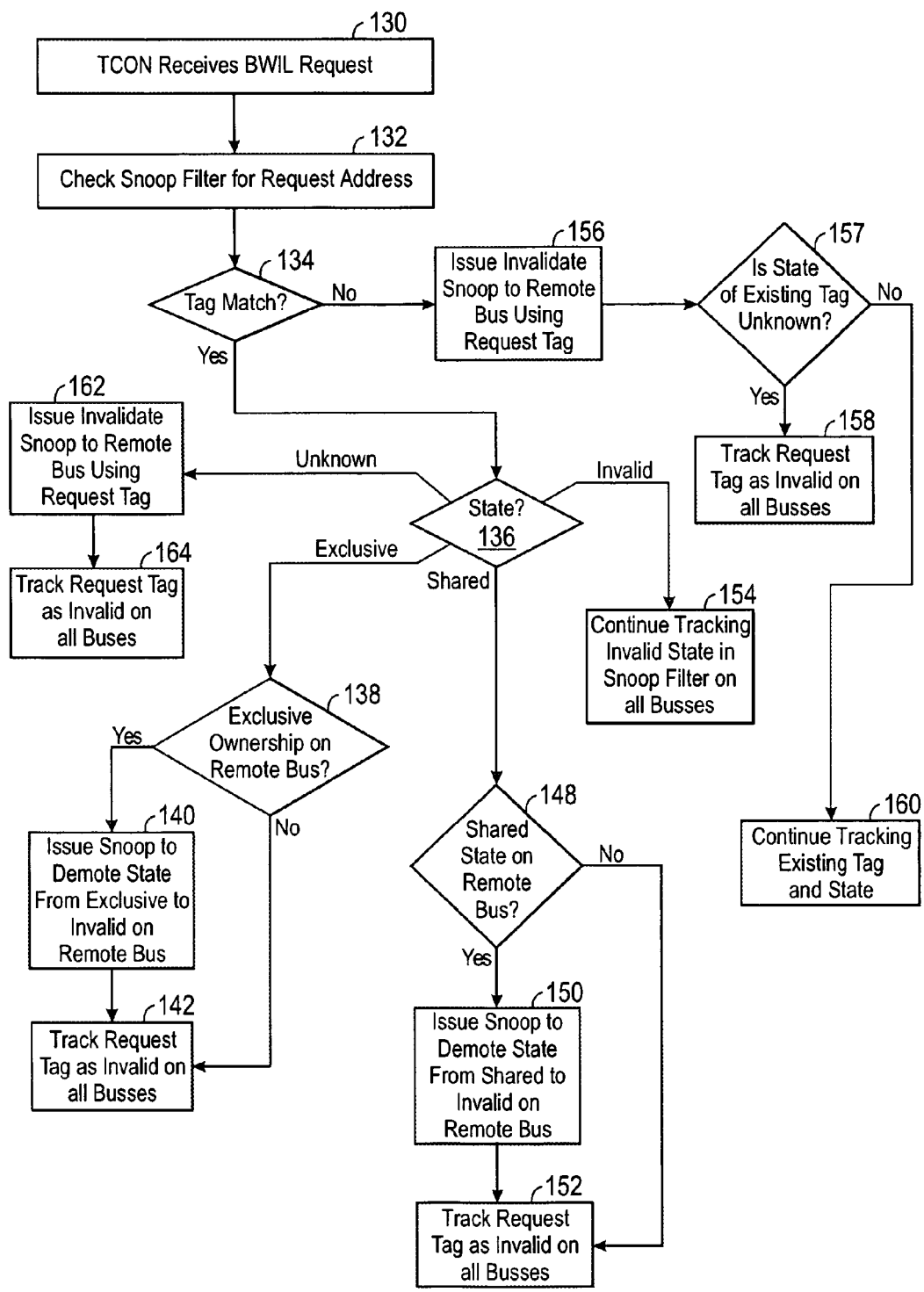

FIG. 6 is a flow chart illustrating the handling of a Bus Write and Invalidate Line (BWIL) request. Generally, in accordance with embodiments of the present invention, the snoop filter 36 tracks BWIL request as invalid since the requesting CPU 12A-12H will allocate the request address as invalid after a BWIL request. When a BWIL request is executed by a CPU 12A-12H, it is received at the tag controller TCON, as indicated in block 130. The tag controller TCON will search the snoop filter for the request address, as indicated in block 132. First, the tag controller TCON will determine whether there is a tag match (i.e., whether the request address is currently being tracked in the snoop filter 36), as indicated in block 134.

If a tag match occurs, the tag controller TCON will determine whether the request is in an exclusive state, an invalid state, a shared state or an unknown state, as indicated in block 136. If the request is in the exclusive state, the tag controller TCON checks the bus-state information stored in the tag RAM 36 to determine whether the cache line indicates exclusive ownership on a remote bus (a bus other than the bus initiating the request) or indicates exclusive ownership on the same bus as the request, as indicated in block 138. If the snoop filter bus-state information indicates exclusive ownership on a remote bus, a snoop is issued to demote the state from exclusive to invalid on the remote-bus CPU cache, as indicated in block 140. Following this snoop cycle, the snoop filter tracks all busses as invalid in the tag RAM 36, as indicated in block 142. Returning to block 138, if a tag match occurs with an exclusive state and the snoop filter bus-state information indicates exclusive ownership on the same bus as the request (requesting bus), the snoop filter tracks all busses as invalid in the tag RAM 36, as indicated in block 142.

Returning to block 136, if there is a tag match, and the request is in the shared state, the tag controller TCON determines whether the cache line is shared on the remote bus or shared on the request bus, as indicated in block 148. If the cache line is in the shared state on the remote bus, a snoop is issued to demote the state from shared to invalid on the remote-bus CPU cache, as indicated in block 150. Following this snoop cycle, the snoop filter tracks all busses as invalid in the tag RAM 36, as indicated in block 152. If the cache line corresponding to the request is not shared on the remote bus (and thus is shared on the request bus), the snoop filter tracks all busses as invalid in the tag RAM 36, as indicated in block 152. If the request is in the invalid state, the snoop filter continues to track all busses as invalid in the tag RAM 36, as indicated by block 154. Finally, if the request is in the unknown state, invalidate-snoops are issued to any bus that is remote to the request bus using the request tag address, as indicated in block 162, and the snoop filter tracks all busses as invalid in the tag RAM 36, as indicated in block 164.

Returning to block 134, the tag controller (TCON) may determine that there is no tag match. If a tag match does not occur, invalidate-snoops are issued to any bus that is remote to the request bus using the request tag address to invalidate potentially shared copies of the data in processor caches, as indicated in block 156. Next, it is determined whether the state of the existing tag RAM is unknown, as indicated in block 157. If the current tag state is Unknown, the snoop filter will track the request tag state as Invalid, as indicated in block 158. If the state of the existing tag RAM is not unknown, the snoop filter continues to track the existing tag and its current state in the tag RAM 36, as indicated by block 160.

Figure 7:
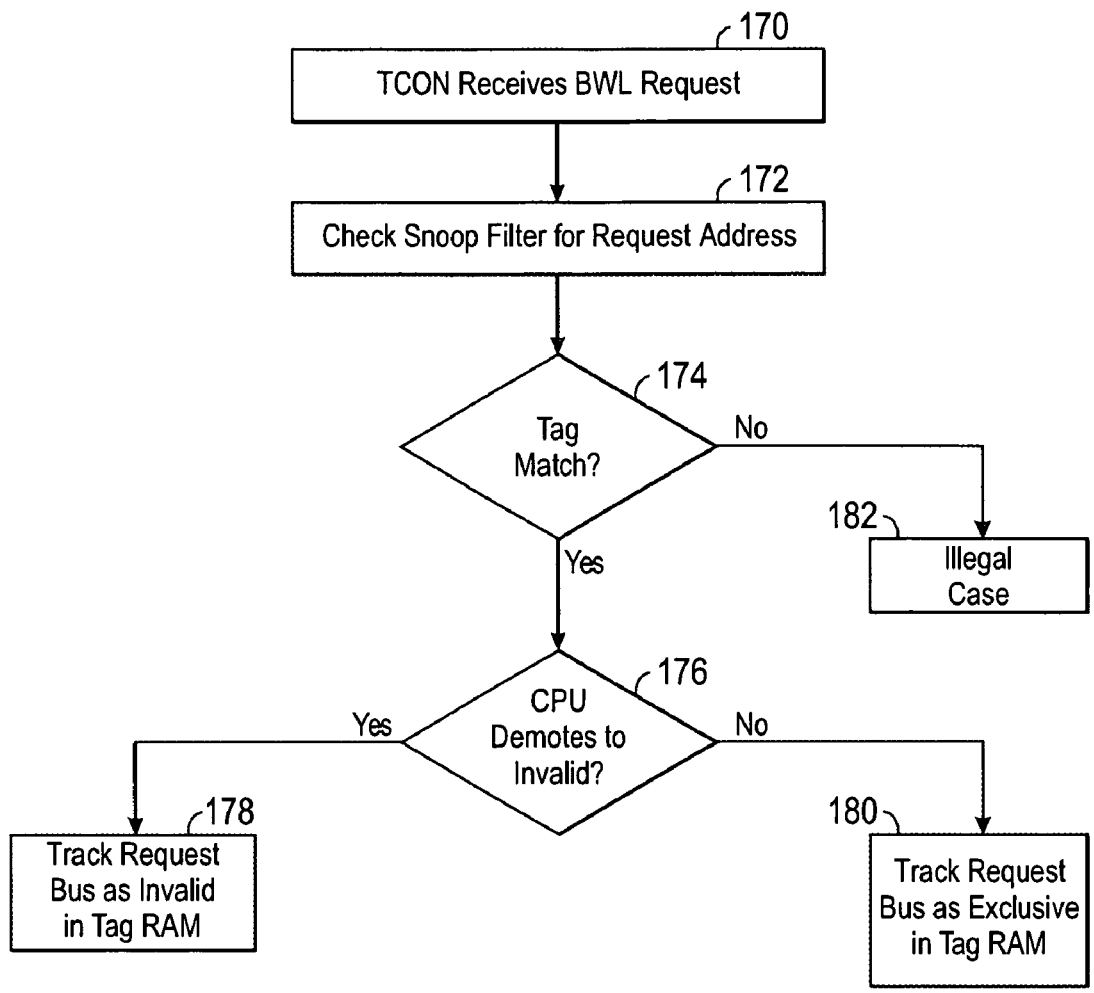

FIG. 7 is a flow chart illustrating the handling of a Bus Write Line (BWL) request. Generally, in accordance with embodiments of the present invention, the snoop filter 36 tracks BWL requests as invalid or exclusive/modified, depending on the CPU architecture (i.e., whether the CPU cache is inclusive or not). When a BWL request is executed by a CPU 12A-12H, it is received at the tag controller TCON, as indicated in block 170. The tag controller TCON will search the snoop filter for the request address, as indicated in block 172. A tag match will always occur with the snoop filter bus-state information indicating exclusive ownership on the same bus as the request, as indicated in block 174. As such, no snoops will be issued to remote busses. Depending on the CPU cache architecture, the snoop filter will update in one of two ways depending on whether the CPU demotes to invalid, as indicated in block 176. If the CPU demotes to invalid following a BWL request, the snoop filter 36 is updated to reflect an invalid state across all buses, as indicated in block 178. If the CPU is allowed to remain at the exclusive or modified state following a BWL, no updates are made to the snoop filter state information and the address will continue to be tracked as exclusive in the snoop filter, as indicated in block 180.

Many of the steps of the exemplary processes described above with reference to FIGS. 3-7 comprise an ordered listing of executable instructions for implementing logical functions. The ordered listing can be embodied in a computer-readable medium for use by or in connection with a computer-based system that can retrieve the instructions and execute them to carry out the previously described processes. In the context of this application, the computer-readable medium can be a means that can contain, store, communicate, propagate, transmit or transport the instructions. By way of example, the computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette, a random access memory (RAM) a read-only memory (ROM), an erasable programmable read-only memory (EPROM or Flash memory), an optical fiber, and a portable compact disk read-only memory (CDROM). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing requests in a computer system comprising:
   receiving a request at a controller, wherein the request has an associated state, a tag and address;
   checking a snoop filter for the address;
   determining whether there is a tag match in the snoop filter;
   determining whether the state of the request is one of exclusive, shared, invalid and unknown;
   if the request is shared, determining whether the request is shared on one of a request bus and a remote bus;
   if the request is shared on the remote bus, tracking the request bus and remote bus as shared in a tag RAM; and
   if the request is shared on the request bus, tracking the request bus as shared in the tag RAM, wherein the tag is not associated with a castout penalty that is an occurrence of a castout snoop on a shared access without a net gain in precise snoop filter state information.

2. The method, as set forth in claim 1, wherein receiving the request comprises receiving a bus read line data (BRLD) request, and further comprising asserting HIT# on the request bus.

3. The method, as set forth in claim 1, wherein receiving the request comprises receiving a bus read line code (BRLC) request.

4. A method of processing requests in a computer system comprising:
   receiving a request at a controller, wherein the request has an associated state, tag and address;
   checking a snoop filter for the address;
   determining whether there is a tag match in the snoop filter;
   determining whether the state of the request is one of exclusive, shared, invalid and unknown;
   if the request is shared, determining whether the request is shared on one of a request bus and a remote bus; and
   if the request is shared on the remote bus, issuing a snoop to demote from an exclusive state to an invalid state on the remote bus, wherein the tag associated with the request is not associated with a castout penalty that is an occurrence of a castout snoop on a shared access without a net gain in precise snoop filter state information.

5. The method, as set forth in claim 4, wherein receiving the request comprises receiving a bus read invalidate line (BRIL) request, and further, if the request is shared on the request bus, tracking the request bus in an exclusive state in the tag RAM.

6. The method, as set forth in claim 4, wherein receiving the request comprises receiving a bus read invalidate (BRIL) request, and further, if the request is shared on the remote bus, issuing a snoop to demote from a shared state in an invalid state on the remote bus and tracking the request in an exclusive state in the tag RAM.

7. The method, as set forth in claim 4, wherein receiving the request comprises receiving a bus write invalidate (BWIL) request, and further, tracking the request bus and the remote bus in an invalid state in the tag RAM.

8. A system comprising:
   a plurality of buses;
   a tag RAM; and
   a tag controller coupled to each of the buses and configured to receive requests, each request having a corresponding one of a plurality of states wherein the tag controller is configured to track only those requests having certain of the plurality of states in the tag RAM and not being associated with a castout penalty that is an occurrence of a castout snoop on a shared access without a net gain in precise snoop filter state information, and wherein the tag controller is further configured not to track those requests not having the certain of the plurality of states.

9. The system, as set forth in claim 8, wherein the tag controller is configured to receive requests, each having a state comprising one of an exclusive state, a shared state, an invalid state and an unknown state.

10. The system, as set forth in claim 9, wherein the certain of the plurality of states excludes the unknown state.

11. The system, as set forth in claim 8, wherein the tag controller is configured to track only those requests allocated to a shared state without an associated castout penalty in the tag RAM.

12. The system, as set forth in claim 8, wherein the tag controller is configured to track Bus Read Line Data (BRLD) requests and Bus Read Line Code (BRLC) requests.

13. The system, as set forth in claim 12, wherein the BRLD requests and the BRLC requests are tracked in the shared state if there is no associated castout penalty.

14. A system comprising:
   a plurality of buses;
   at least one processor coupled to each of the plurality of buses; and
   a snoop filter configured to eliminate unnecessary snoops of the plurality of buses, and further configured to track requests from the at least one processor only if tracking the request does not result in a castout penalty, wherein a castout tag is retained, a castout snoop is canceled and the request is dropped from the snoop filter if the request causes the snoop filter castout that discards state information associated with the castout tag.

15. The system, as set forth in claim 14, wherein the snoop filter is configured to receive the request on a request bus, wherein the request comprises a tag, an address and a state, and wherein the snoop filter is configured to snoop a remote bus for the tag corresponding to the request.

16. The system, as set forth in claim 15, further comprising a tag RAM, wherein the tag corresponding to the request is tracked in the tag RAM only if the state corresponding to the request is one of an exclusive state and a shared state.

* * * * *

UNITED STATES PATENT AND TRADEMARK OFFICE
CERTIFICATE OF CORRECTION

| | | |
|---|---|---|
| PATENT NO. | : 7,502,895 B2 | Page 1 of 1 |
| APPLICATION NO. | : 11/225937 | |
| DATED | : March 10, 2009 | |
| INVENTOR(S) | : Phillip Matthew Jones et al. | |

It is certified that error appears in the above-identified patent and that said Letters Patent is hereby corrected as shown below:

In column 13, line 54, in Claim 6, after "invalidate" insert -- line --.

In column 13, line 56, in Claim 6, after "state" delete "in" and insert -- to --, therefor.

In column 13, line 57, in Claim 6, after "request" insert -- bus --.

In column 14, line 2, in Claim 7, after "invalidate" insert -- line --.

Signed and Sealed this

Eleventh Day of August, 2009

David J. Kappos
*Director of the United States Patent and Trademark Office*